Jan. 25, 1955

J. J. DENOVAN ET AL 2,700,512

VERTICAL AXIS ROTARY BEATER MILL FOR
TREATMENT OF FIBROUS MATERIALS

Filed June 6, 1952

2 Sheets-Sheet 1

INVENTOR
John J. Denovan and Robert A. Denovan

BY

Alex. E. MacRae

Attorney.

INVENTOR
John J. Denovan and Robert A. Denovan
BY
Attorney.

United States Patent Office 2,700,512
Patented Jan. 25, 1955

2,700,512

VERTICAL AXIS ROTARY BEATER MILL FOR TREATMENT OF FIBROUS MATERIALS

John J. Denovan, Lachine, Quebec, and Robert A. Denovan, Montreal West, Quebec, Canada Application June 6, 1952, Serial No. 292,125

3 Claims. (Cl. 241—154)

This invention relates to the treatment of fibrous materials, such as asbestos and the like.

It is an object of the invention to provide a simple, effective, and efficient method and machine for opening and separating fibers, such as is required in the treatment of asbestos. A more specific object is to provide a machine for opening fine rock particles and for extracting short fiber from fine residues such as the undersize from fiber cleaning screens.

The invention contemplates the provision of a continuous feed chamber having therein a plurality of horizontally disposed vertically aligned material-beating zones and means below said zones for causing an air current to flow downwardly through the zones and for discharging the treated material in a substantially horizontal direction.

Figure 1:
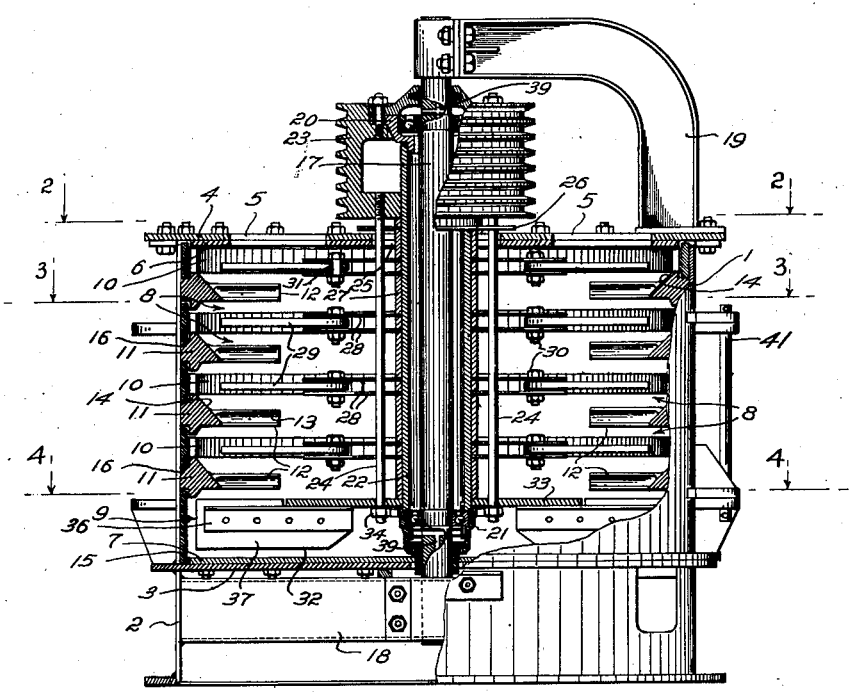
Figure 2:
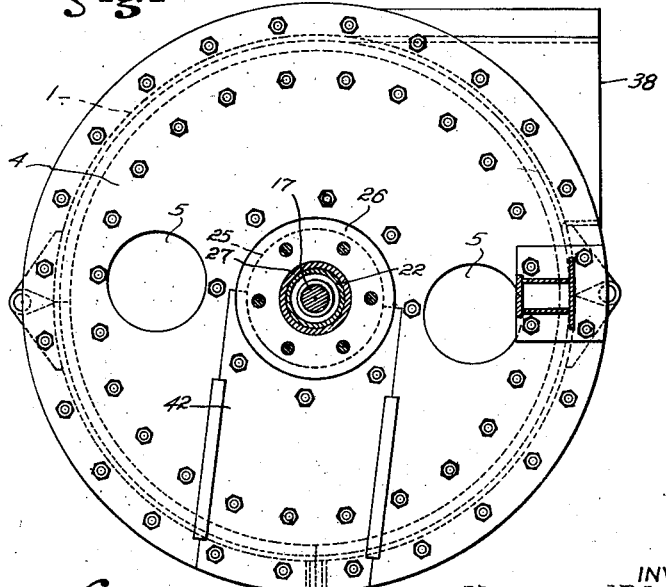
Figure 3:
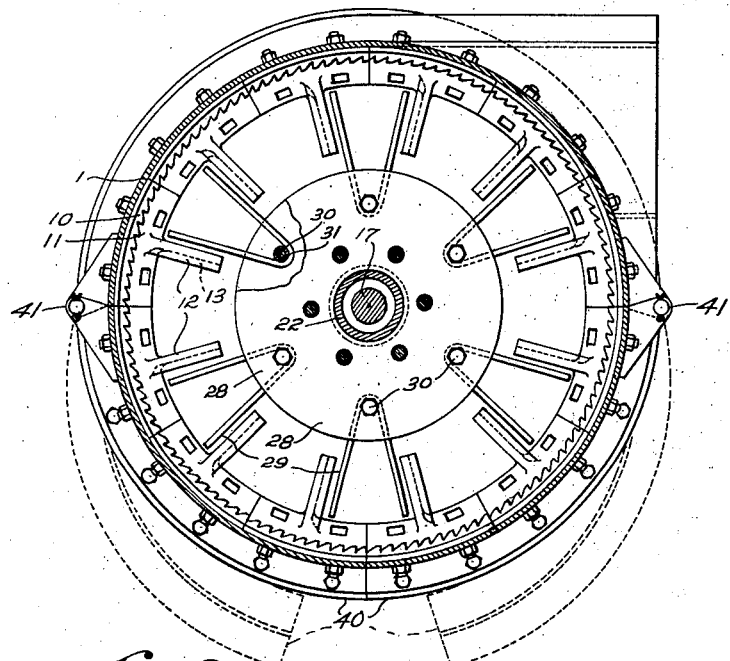
Figure 4:
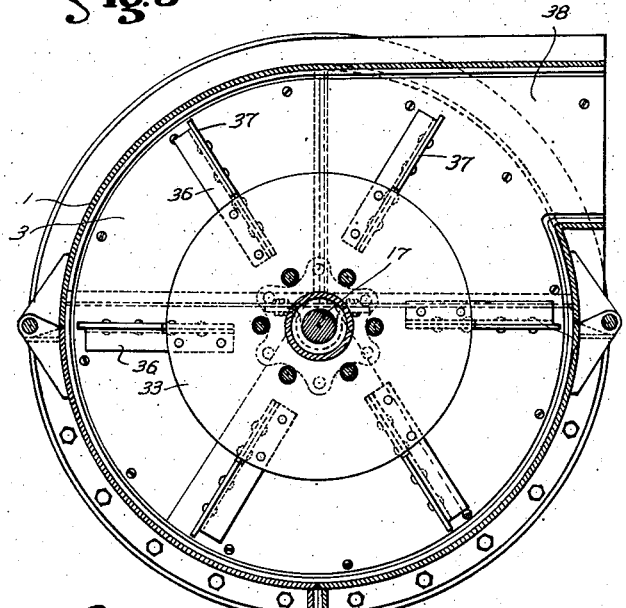

The invention will be described with reference to the accompanying drawings in which, Fig. 1 is a side elevation, partly in section, of a machine in accordance with the invention, Fig. 2 is a plan view on line 2—2 of Fig. 1, Fig. 3 is a plan view on line 3—3 of Fig. 1, and Fig. 4 is a plan view on line 4—4 of Fig. 1.

In the drawing, 1 is a cylindrical casing mounted upon a base 2 and having a closed bottom wall 3 and a top wall or cover plate 4 provided with suitable feed openings 5. Preferably, the top and bottom walls are provided with complementary liner plates 6 and 7, respectively.

The chamber formed by the casing comprises a plurality of horizontally disposed, vertically aligned beating zones 8 and an air sweeping zone 9, all of such zones being in free and direct communication with each other. Each zone 8 is lined with an upper internally saw-toothed ring 10, which is preferably formed in a plurality of segments, as shown, for ease of construction, assembly and replacement, and a lower baffle ring 11, also preferably of segmental form. Each ring 11 is provided with a plurality of radially inwardly directed fingers 12, one face of each of which is complementarily grooved as indicated at 13. The internal surface of ring 11, from which the baffle fingers 12 project, is preferably downwardly inclined from a point adjacent its juncture with ring 10 to its lower edge (which is thus of smaller diameter than its upper edge) to provide a surface 14 for downward deflection of material.

Zone 9 is also provided with a liner ring 15. Baffle rings 11 may have recessed edges 16 for interlocking relation with rings 10 and 15.

Extending axially through the casing is a shaft 17, stationarily supported therein by means of a bracket 18 carried by the base 2 and a bracket 19 mounted on the cover plate 4. The shaft 17 supports bearings 20 and 21 adjacent the upper and lower ends, respectively, thereof, a tubular spacer 22 extending between the bearings, as shown. A driving sheave 23 is mounted on bearing 20 and is driven by any suitable means (not shown). Driving connection from the sheave 23 comprises a plurality of rods 24 suspended from the sheave and extending in an axial direction through an opening 25 in the cover plate into the casing, a disc 26 surmounting the opening 25 and through which the rods extend, and a tubular rotor 27 surrounding the tubular spacer 22.

Mounted in each zone 8 is a beating device comprising a pair of axially aligned and spaced annular spider plates 28 supported on rotor 27 and through which the rods 24 extend for revolution therewith. The pair of plates carry in pivotal relation therebetween a plurality (six as shown) of equally spaced beating members or flybars 29, of generally hairpin or V-shaped by means of bolts 30 and bushings 31. As shown, each flybar has a pair of arms extending in diverging relation to each other, the arms being joined by a curved portion freely seated on the bushing 31. Each flybar 29 is located opposite a liner ring 10 and between the two adjacent series of fingers 12.

Mounted in zone 9 is a fan 32 comprising an annular runner plate 33, the inner periphery of which bears upon the end of rotor 27 and through which the rods 24 extend, the plate being secured to the rods by nuts 34. Suspended from, and extending radially from, the plate 33, by means of angle members 36, are a plurality of flat blades 37 disposed in a vertical or axial plane. The zone 9 is provided with a horizontally disposed tangential discharge outlet 38 formed in the casing and liner walls.

Efficient lubrication of the bearings 20 and 21 may be effected by means of passages 39 in the stationary shaft 17, and such passages may be conveniently connected to a continuous circulation oil system.

The casing is preferably provided with a pair of doors 40 mounted on hinges 41, such doors constituting one-half of the casing wall to permit convenient access to the interior thereof. A door 42 may also be provided in the cover plate.

While the dimensions of the machine may vary within wide limits, a casing 48 inches in diameter and 29 inches high is satisfactory for the treatment of asbestos fibers. The casing may be made of steel and the liners and baffle rings of abrasion resistant cast iron. The flybars are preferably formed of heat treated spring steel.

The general operation of the device will be clear from the foregoing description. The material for treatment is fed through openings 5. The beating devices and fan are driven at any desired speed, a speed of 1250 R. P. M. being normally satisfactory for treatment of asbestos particles. Centrifugal force causes the pivotally mounted flybars to extend in a generally radial direction when the machine is in operation, the ends of the flybars being in spaced relation (say, from two to three inches) to the inner surface of the respective liner ring 10. The beating devices are driven in a clockwise direction with the grooved faces of the baffle fingers 12 facing in a counter-clockwise direction. The revolving flybars, baffle fingers, and saw-toothed lines, by impact therewith of the material particles under treatment, perform an efficient fiber opening operation. Since the suction side of the fan is above the same, a downwardly directed air sweeping action is produced on the material under treatment, the air for this purpose entering the feed openings 5 with the material. This air sweeping action assists in the fiber-opening effect of the beating devices by promptly removing fines. The fan also discharges the treated material through outlet 38.

As previously indicated, the device is particularly useful for the treatment of asbestos ore particles, and is effective in opening the fibers thereof. It may be used on all grades of asbestos particles in the approximate range from spinning fiber down to Group 7. It is also useful in extracting short fiber from fine residues such as the undersize from fiber cleaning screens. It is generally useful in the treatment of rock particles not substantially larger than the undersize from approximately a 3 by 3 mesh screen. The effects obtained can be controlled by the rate of feed, the amount of air sweeping, and by the number of flybars used. The machine is also subject to speed variation provided such speed is not reduced below the fan requirements.

The capacity of the machine varies with the material being processed and results desired. The machine described has a capacity of about one ton per hour for long fiber to about five tons per hour for the undersize from cleaning screens.

I claim:

1. A machine for treating fibrous ore particles comprising an upright cylindrical casing, a rotor axially mounted in the casing, a plurality of beating devices mounted in axially spaced relation in the casing and each comprising a pair of annular plates mounted on the rotor, means for revolving said plates in unison with said rotor and a series of flybars circumferentially arranged about said plates, each flybar having a pair of diverging arms and an intermediate curved portion seated between said pair of plates, means pivotally retaining each said flybar between said pair of plates, said flybars being in spaced relation to each other to permit free swinging movement thereof, a liner ring in the casing opposite each series of flybars, the interior surface of the liner ring being saw-toothed, a baffle ring in the casing between each adjacent pair of liner rings, said baffle ring having radially inwardly directed baffle fingers thereon, and a fan mounted on the rotor below said beating devices, said casing having an outlet laterally opposite the fan, said fan having a radial discharge to provide a current of air flowing downwardly through the beating devices and laterally through said outlet.

2. A machine for treating fibrous ore particles as defined in claim 5, including said revolving means comprising a shaft mounted in the casing and extending through the casing in axial and stationary relation with respect thereto, bearings supported on the shaft, said rotor being of tubular form and being supported on said bearings in sleeved relation to the shaft, and a driving sheave mounted on the casing and constituting a portion of the rotor, said means for revolving said plates including a plurality of axially directed rods fixed to the sheave and extending through said annular plates.

3. A machine for treating asbestos ore particles comprising an upright cylindrical casing, a rotor axially mounted in the casing, a plurality of beating devices mounted in vertically spaced relation in the casing and each comprising a pair of annular plates mounted on the rotor, means for revolving said plates in unison with the rotor, and a series of flybars circumferentially arranged about said plates, each flybar having a pair of diverging arms and an intermediate curved portion seated between said pair of plates, and a retaining pin for each flybar extending through said pair of plates, each pin having a bushing thereon between said pair of plates, said bushing being freely engaged by said flybar to permit pivotal movement of the flybar thereabout, and said flybars being in spaced relation to each other to permit free swinging movement thereof.

References Cited in the file of this patent

UNITED STATES PATENTS

| Number | Name | Date |
|---|---|---|
| 248,923 | De Champ | Nov. 1, 1881 |
| 1,513,279 | Sawford | Oct. 28, 1924 |
| 1,636,033 | Agnew | July 19, 1927 |
| 1,669,239 | Grindle | May 8, 1928 |
| 1,798,465 | Grindle | Mar. 31, 1931 |
| 2,359,911 | Grindle | Oct. 10, 1944 |
| 2,448,849 | Wagner | Sept. 7, 1948 |

FOREIGN PATENTS

| Number | Country | Date |
|---|---|---|
| 94,605 | Germany | Oct. 18, 1897 |
| 390,584 | Germany | Feb. 21, 1924 |
| 874,310 | France | Apr. 27, 1942 |